(12) United States Patent
van der Weide et al.

(10) Patent No.: US 7,368,305 B2
(45) Date of Patent: May 6, 2008

(54) HIGH ASPECT RATIO MICROMECHANICAL PROBE TIPS AND METHODS OF FABRICATION

(75) Inventors: Daniel W. van der Weide, Madison, WI (US); Yaqiang Wang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 187 days.

(21) Appl. No.: 11/150,856

(22) Filed: Jun. 10, 2005

(65) Prior Publication Data

US 2006/0278825 A1    Dec. 14, 2006

(51) Int. Cl.
*H01L 21/00* (2006.01)
(52) U.S. Cl. .......................... 438/20; 438/734
(58) Field of Classification Search ................ 438/20, 438/706, 712, 719, 734
See application file for complete search history.

(56) References Cited

U.S. PATENT DOCUMENTS

| | | | |
|---|---|---|---|
| 4,968,585 A | 11/1990 | Albrecht et al. | |
| 5,382,795 A | 1/1995 | Bayer et al. | |
| 5,501,893 A | 3/1996 | Laermer et al. | |
| 6,069,018 A * | 5/2000 | Song et al. | 438/20 |
| 6,133,615 A | 10/2000 | Guckel et al. | |
| 6,140,760 A * | 10/2000 | Toyoda et al. | 313/495 |
| 7,078,249 B2 * | 7/2006 | Zhang | 438/20 |
| 2004/0060902 A1 * | 4/2004 | Evans et al. | 216/41 |
| 2007/0178014 A1 * | 8/2007 | Haushalter et al. | 422/100 |

OTHER PUBLICATIONS

Masakazu Kanechika, Noriaki Sugimoto, and Yasuichi Mitsushima, Control of Shape of Silicon Needles Fabricated by Highly Selective Anisotropic Dry Etching, J. Vac. Sci. Technol. B, vol. 20, No. 4, pp. 1298-1302, Jul./Aug. 2002.

Anja Boisen, Ole Hansen, and Siebe Bouwstra, AFM Probes with Directly Fabricated Tips, J. Micromech. Microeng., vol. 6, pp. 58-62, IOP Publishing Ltd., 1996.

F. M. Serry, P. J. Nagy, J. Horwitz, P.I. Oden, Ph. D., M. G. Heaton, 3D MEMS Metrology with the Atomic Force Microscope, Veeco Metrology Group, Santa Barbara, CA, 2002.

F. M. Serry, M. L. Osborn, T. Ballinger, R. Olds, J. Horwitz, T. Chi, M. G. Heaton, 3D MEMS Metrology with the Stylus Profiler and the Atomic Force Profiler, Veeco Metrology Group, Santa Barbara, CA, 2002.

(Continued)

*Primary Examiner*—Tuan H. Nguyen
(74) *Attorney, Agent, or Firm*—Foley & Lardner LLP

(57) ABSTRACT

A method of fabricating high aspect ratio micromechanical tips is provided. The method includes, but is not limited to, forming an etchant protective island on a surface of a silicon substrate with the silicon substrate exposed around the island; isotropically etching the silicon substrate by reactive ion etching around the protective island to partially undercut the silicon substrate beneath the protective island; anisotropically etching, by deep reactive ion etching, the silicon surrounding the island to a desired depth to define a tip shaft of the desired height supported at a base by the substrate; removing the protective island from the tip; and sharpening the top of the tip shaft to an apex. Using the method, micromechanical tips having heights greater than at least 30 µm have been obtained while maintaining the vertical sidewall necessary for both AFM and scanning near-field microwave microscopy (SNMM) profiling applications.

14 Claims, 6 Drawing Sheets

OTHER PUBLICATIONS

STS Poly / Si Etcher, Chapter 7.8, pp. 1-8, from http://microlab.berkeley.edu/labmanual/chap7/7.8.html website, printed May 28, 2005.

R & D Foundry, Advanced Processes for Micro and Nano Electro Mechanical Systems and Wafer Level Packaging, brochure, Version 1.0, Institute of Microelectronics, from http://www.ime.a-star.edu.sg/foundry/pdf/fabrication.pdf, Jan. 1, 2005.

Micro Machining Systems, AMS 100 "I-Speeder" Deep RIE ICP System, brochure, Alcatel, from http://www.adixen.com/adixen_avt/download/docs/prod/doc2prod52.pdf website, Nov. 20, 2004.

Micro Machining Systems, AMS 200 "I-Speeder" Deep RIE ICP System, brochure, Alcatel, from http://www.adixen.com/adixen_avt/download/docs/prod/doc2prod54.pdf, Nov. 20, 2004.

* cited by examiner

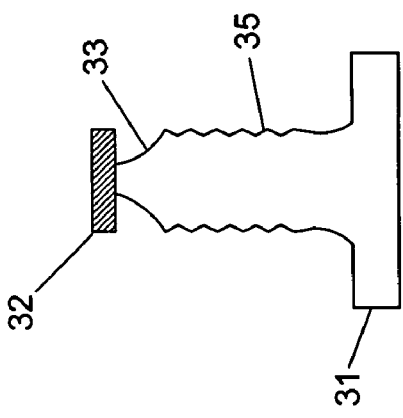
FIG. 1
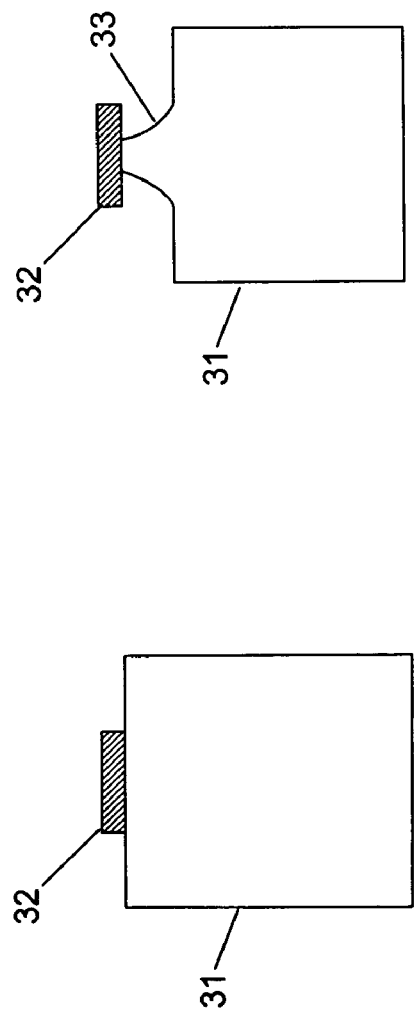
FIG. 2
FIG. 3
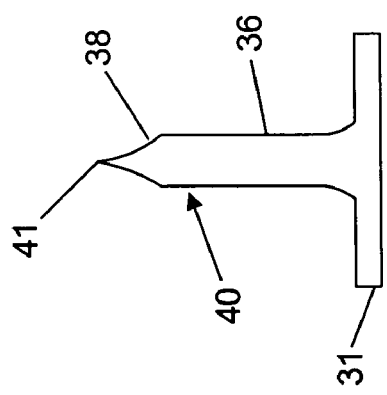
FIG. 4
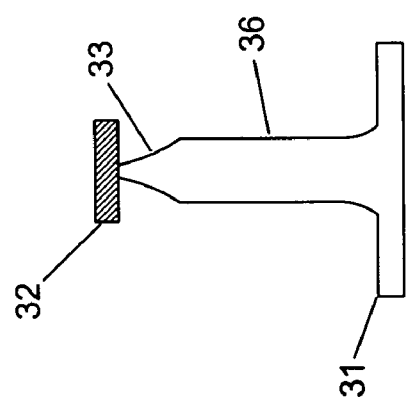
FIG. 5

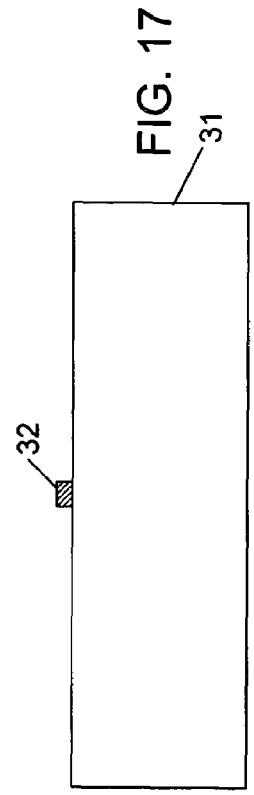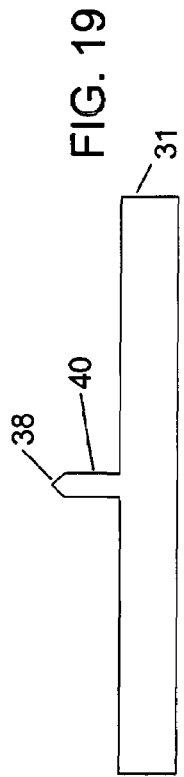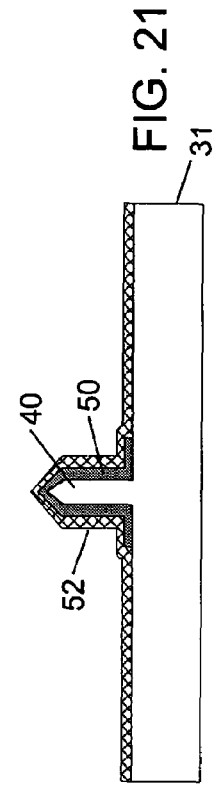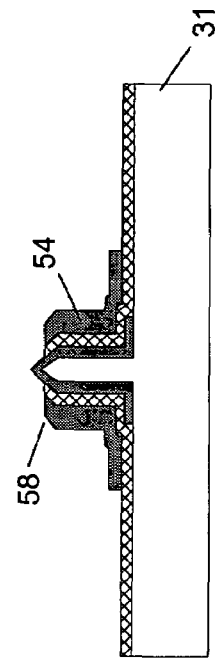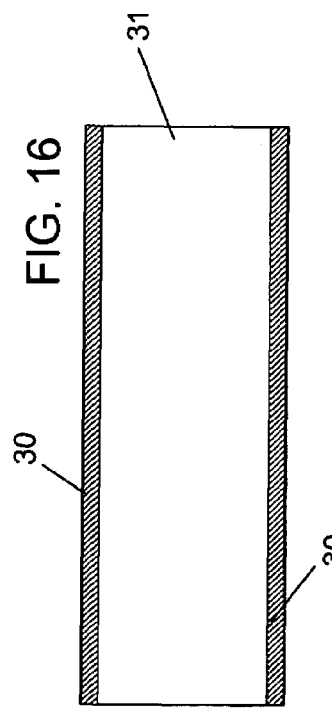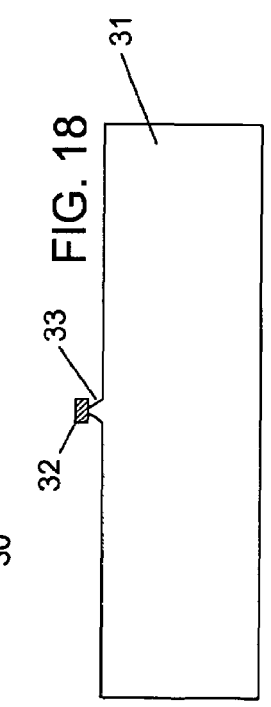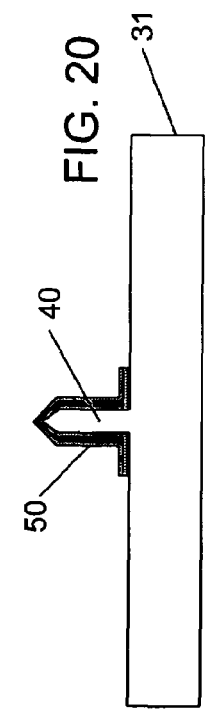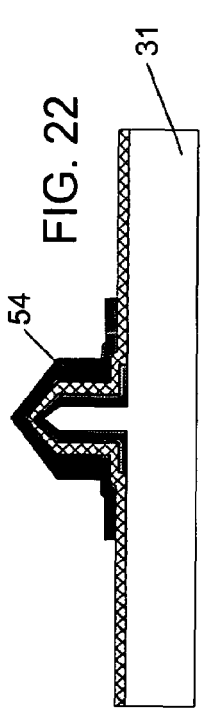

HIGH ASPECT RATIO MICROMECHANICAL PROBE TIPS AND METHODS OF FABRICATION

REFERENCE TO GOVERNMENT RIGHTS

This invention was made with United States government support awarded by the following agency: USAF/AFOSR F49620-03-1-0420. The United States government has certain rights in this invention.

FIELD OF THE INVENTION

This invention pertains generally to the field of micro-electro-mechanical systems (MEMS) and microfabrication techniques and particularly to microfabricated probe tips.

BACKGROUND OF THE INVENTION

Microfabricated ultra sharp tips may be utilized in various applications, including for example, electrostatic ion sources, atomic force microscopy, and spectroscopy. Very high aspect ratio atomic force microscope (AFM) tips, for example, are necessary to allow deep access to structural features during semiconductor processing and in the metrology of micro-electro-mechanical systems (MEMS) structures. S. Hosaka, et al., App. Surf. Sci., Vol. 188, 2002, pp. 467 et seq. Various techniques have been developed for the fabrication of high aspect ratio micro-tips. One approach utilizes semiconductor processing techniques to produce ultra-sharp silicon tips. See, I. W. Rangelo, et al., J. Vac. Sci. Technol., Vol. B16, 1998, pp. 3185 et seq.; E. P. Givargizov, et al., Ultramicroscopy, Vol. 82, 2000, pp. 57 et seq.; J. Thaysen, et al., Sens. Actuators, Vol. 883, 2000, pp. 47 et seq. Another approach attaches carbon nanotubes to conventional AFM tips. See, A. Olbreich, et al., J. Vac. Sci. Technol., Vol. B17, 1999, pp. 1570 et seq.; S. Rozhok, et al., J. Vac. Sci. Technol., Vol. B21, 2003, pp. 323 et seq.; A. B. H. Tay and J. T. L. Thong, Appl. Phys. Lett., Vol. 84, 2004, pp. 5207 et seq. Focused ion beam milling has also been utilized to make super-sharp tips, as discussed in, e.g., A. Olbrich, et al., supra, and P. Morimoto, et al., Jpn. J. Appl. Phys., Vol. 41, 2002, pp. 4238 et seq. All of these techniques involve relatively complex processing procedures, with attendent high-costs, and generally are unable to achieve tip heights greater than 30 μm, particularly with high aspect ratios of 5 or greater.

Another application for microfabricated tips has been scanning near-field microwave microscopy (SNMM), which is used to characterize semiconductor materials and to measure biomedical samples. Such near-field techniques allow subwavelength resolution and the penetration of electromagnetic fields to allow imaging of subsurface features. See, e.g., J. Park, et al., Ultra Microscopy, 2005; pp. 101-106; M. Tabib, Azar and Y. Wang, IEEE Trans. Microwave Theory & Tech., Vol. 52, No. 3, March 2004, pp. 971-979; B. T. Rosner and D. W. Van Der Weide, Rev. Sci. Instrum., Vol. 73, 2002, pp. 2505-2525. Coaxial waveguides have the advantage of supporting microwave signals with nearly no cut-off limit and producing highly confined electromagnetic fields through the coaxial structure. A. Kramer, et al., Micron, Vol. 27, December 1996, pp. 413-417. Most existing scanning near-field microwave microscopy probes use open-ended coaxial cables with a protruding center tapered tip or similar coaxial structures. A. Imtiaz, et al., Ultramicroscopy, Vol. 94, 2003, pp. 209-216. AFM compatible SNMM probes have been developed using MEMS processing techniques. M. Tabib-Azar and Y. Wang, supra; B. T. Rosner, et al., Sens. Actuators A Phys. Vol. 102, December 2002, pp. 185-194. Such tips have the advantag of miniature size, with a potential for even greater resolution, for batch microfabrication, and for compatibility with commercial AFM systems.

The key component of a microfabricated SNMM probe is a coaxial tip integrated with an AFM cantilever to conduct simultaneous topographic and microwave imaging. Despite successful implementation of microfabricated SNMM probes with coaxial tips, parasitic capacitive coupling with the metallization on the cantilever and the chip body is still a problem that limits coaxial tip microwave imaging. See M. Tabib-Azar and Y. Wang, supra. One approach to this problem is to increase the tip height, thereby decreasing the parasitic capacitance between the cantilever and the sample, an approach which has had limited success because of the difficulty of producing microfabricated probe tips with heights greater than about 10 μm.

SUMMARY OF THE INVENTION

The present invention relates to a micromechanical tip and a method of fabricating high aspect ratio micromechanical tips. It has proven difficult to etch single pillar micromechanical tip having a height greater than about 20 μm while maintaining a vertical sidewall profile using deep reactive ion etching (DRIE) techniques. Using the method of the present invention, micromechanical tips having heights greater than at least 30 μm can be obtained while maintaining the vertical sidewall necessary for both AFM and SNMM profiling applications.

The method includes forming an etchant protective island on a surface of a silicon substrate with the silicon substrate exposed around the island. The silicon substrate is etched isotropically by reactive ion etching (RIE) around the protective island to partially undercut the silicon substrate beneath the protective island. The silicon surrounding the island is anisotropically etche using DRIE etching to define a tip shaft of the desired height. The tip shaft is supported at a base by the substrate. The tip shaft sidewall may be smoothed by a wet chemical clean and RIE to remove characteristic scalloping features from the DRIE step, which is very important for MEMS metrology functions in deep trench scan. The RIE creates a desired shaft diameter at the same time. The protective island is removed from the tip. The top of the tip shaft is sharpened to an apex possibly using oxidation sharpening.

Other principal features and advantages of the invention will become apparent to those skilled in the art upon review of the following drawings, the detailed description, and the appended claims.

BRIEF DESCRIPTION OF THE DRAWINGS

In the drawings:

FIG. 1 is a simplified view of an initial silicon substrate with a patterned protective oxide island formed thereon.

FIG. 2 is a view as in FIG. 1 after an isotropic reactive ion etching.

FIG. 3 is a view as in FIG. 2 after a further step of anisotropic deep reactive ion etching.

FIG. 4 is a view as in FIG. 3 after a further step to smooth the sidewalls of the shaft of the probe tip.

FIG. 5 is a view as in FIG. 4 after removal of the protective oxide island and sharpening of the tip apex.

FIG. 16 is a simplified view of a oxide covered substrate which may be utilized in producing cantilever probes in accordance with the invention.

FIG. 17 is a view as in FIG. 16 after an initial patterning of the oxide layer.

FIG. 18 is a view as in FIG. 17 after an initial etching step.

FIG. 19 is a view as in FIG. 18 after etching and sharpening steps to provide the sharpened high aspect ratio probe tip.

FIG. 20 is a view as in FIG. 19 after deposit of a first conductive layer on the apex and the shaft of the probe.

FIG. 21 is a view as in FIG. 20 after deposit of an insulating layer over the first conductive layer.

FIG. 22 is a view as in FIG. 21 after deposit of a second conductive layer over the insulating layer.

FIG. 23 is a view as in FIG. 22 after removal of the second conductive layer and the insulating layer in the region of the apex to expose the apex covered with the first conductive layer and with the second conductive layer separated and insulated therefrom.

DETAILED DESCRIPTION OF THE INVENTION

Figure 6:
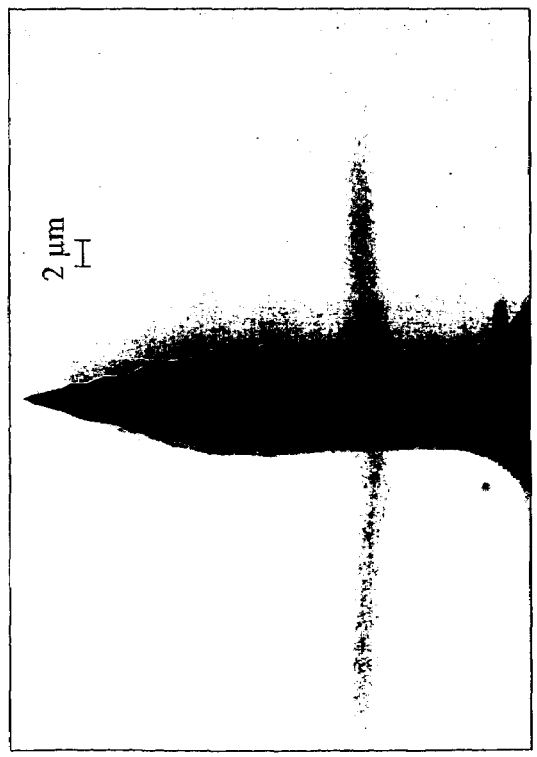
FIG. 6 is a perspective micrograph view of a completed micromechanical probe tip in accordance with the invention.

With reference to the drawings, an exemplary process for producing micromechanical high aspect ratio tips in accordance with the invention is illustrated in schematic form in FIGS. 1-5.

First, as illustrated in FIG. 1, a 1 μm thick thermal oxide is grown on a Si (100) wafer 31 and an (e.g., 16 μm-diameter) oxide protective island 32 is patterned in the oxide by standard photolithography and buffered hydrofluoric (BHF) acid etch. The exposed Si is etched by RIE ($SF_6$, 45 sccm, 50 mTorr, 100 W) to form a tip precursor 33 that will determine the final tip shape, as shown in FIG. 2. Alternatively, wet etching can be performed through use of an HNA solution mixture (i.e. $HNO_3:CH_3COOH:HF$ (1:3:8 in volume ratio)). The etching selectivity of silicon in comparison with silicon dioxide is lower, however.

Next, a DRIE process is performed using a commercial STS® Multiplex ICP system (Surface Technology Systems, Redwood City, Calif.) to form a tip shaft 35 as illustrated in FIG. 3. The process starts from a $C_4F_8$ deposition (85 sccm, 6 seconds, APC 66-degree, RF 600 W), which alternates with $SF_6$ etching steps (130 sccm, 8 seconds, APC 66-degree, RF 600 W). Because DRIE generates characteristic scalloping features on the sidewall of the tip shaft, an $SF_6/O_2$ etching ($SF_6$ 45 sccm, $O_2$ 5 sccm, 50 mTorr, 100 W) is used to form a smooth sidewall and desired tip shaft diameter 36 after a wet chemical solution ($H_2SO_4:H_2O_2$ (4:1 in volume ratio)) cleans the tip wafer, as illustrated in FIG. 4. The protective oxide island 32 is removed with hydrofluoric acid. An apex 38 tip 41 is sharpened by oxidation sharpening at 950° C. to form the final micromechanical tip 40 as shown in FIG. 5. In an exemplary embodiment, oxidation sharpening uses a wet oxidation at 950° C. in a silica furnace for 4 hours to get 600 nm silicon dioxide. Using other substrate materials, oxidation sharpening is not applicable. Instead, a wet etching method can be used if necessary.

Figure 7:
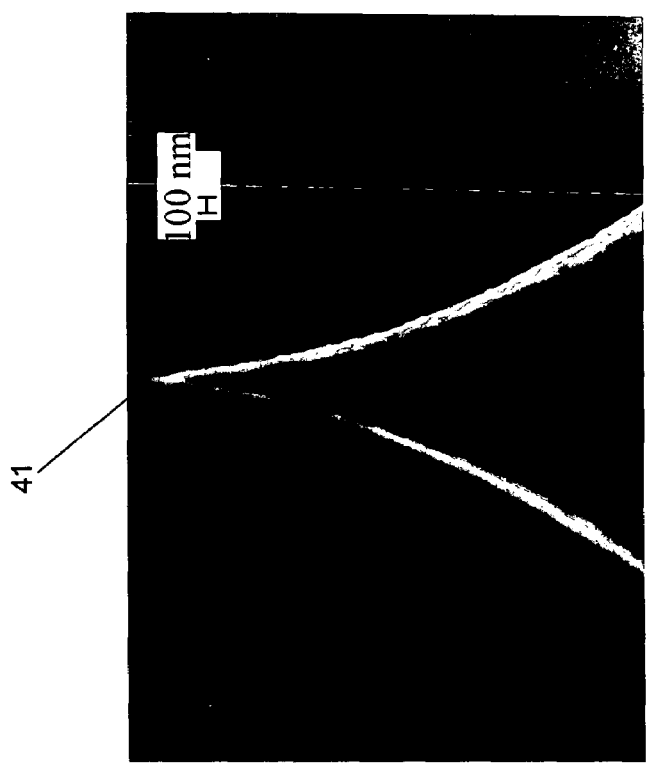
FIG. 7 is a detailed micrograph of the apex section of a micromechanical tip of the invention.

FIG. 6 shows an SEM micrograph of a microfabricated high aspect ratio tip using this method. The height of the tip is 42 μm with an aspect ratio of 7 (the ratio of tip height to tip shaft width). FIG. 7 is a closer view of the apex region of the tip, whose top point 41 radius is estimated to be 10 nm. Tips were fabricated on a single wafer chip with heights of 40 μm±2 μm, and were repeated for multiple runs. The major process cost comes from the STS DRIE process, which is comparatively low using a high silicon etch rate and batch processing. The tip height can be larger than 100 μm using this method, and is limited only in the etch selectivity of silicon versus the silicon dioxide protective island during RIE and DRIE steps.

Other commercial DRIE equipment may also be used in this process, e.g., the PlasmaTherm SLR-770 Ion Etcher and the Alcatel 601E ICP etchers. Generally, high aspect ratio tip etching can be carried out on larger area substrates after tip mask patterning (e.g., on 4-inch or larger wafers): First, isotropic RIE is used to achieve the desired tip precursor. Second, an STS recipe with a strong passivation cycle is used for 5-10 minutes to enable the tip shaft to maintain a vertical sidewall (e.g., etch cycle: 105 sccm $SF_6$, 10.5 seconds, 8 W platen power; passivation cycle: 95 sccm $C_4F_8$, 10 seconds, 6 W platen power; RF coil power 600 W and APC 50-degree in both cycles). Third, a more aggressive STS recipe continues the tip shaft etching until achieving the desired shaft length (etch cycle: 130 sccm $SF_6$ and 13 sccm $O_2$, 10 seconds, 9 W platen power; passivation cycle: 110 sccm $C_4F_8$, 9 seconds, 0 W platen power; RF coil power is 600 W and fix chamber pressure to be around 20 mTorr during both cycles, $H_2SO_4:H_2O_2$ (4:1) solution cleans the tip wafer). Steps to smooth the shaft sidewall, and sharpen the tip then can be carved out as discussed above.

Figure 12:
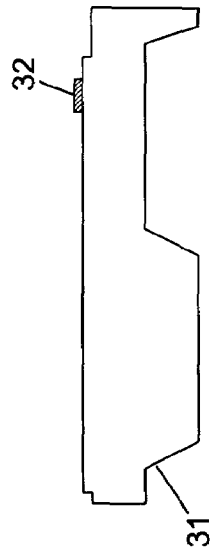
FIG. 12 is a view as in FIG. 11 after formation of patterned oxide where the probe tip is to be formed.
Figure 13:
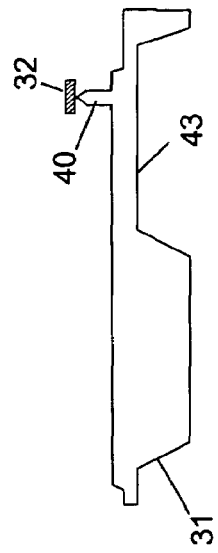
FIG. 13 is a view as in FIG. 12 after etching steps under the protective oxide island.
Figure 14:
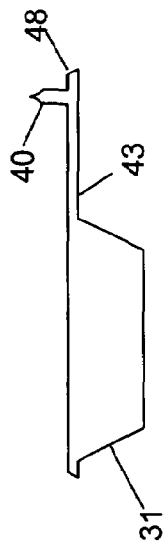
FIG. 14 is a view as in FIG. 13 after removal of the oxide protective island, sharpening of the tip, and etching of the cantilever beam to its final dimensions.
Figure 8:
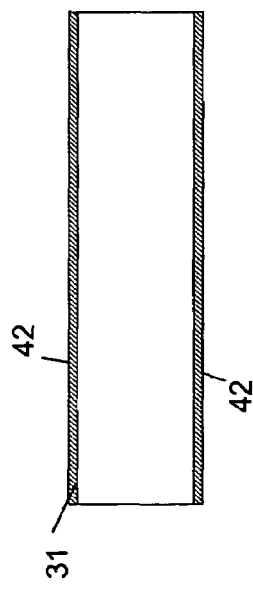
FIG. 8 is a simplified view of an initial substrate, with an oxide formed on the surfaces thereof, for production of a cantilever beam with integrated probe tip.
Figure 9:
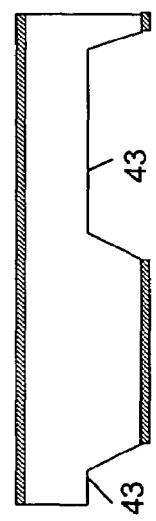
FIG. 9 is a view as in FIG. 8 after an initial backside etching and patterning.
Figure 10:
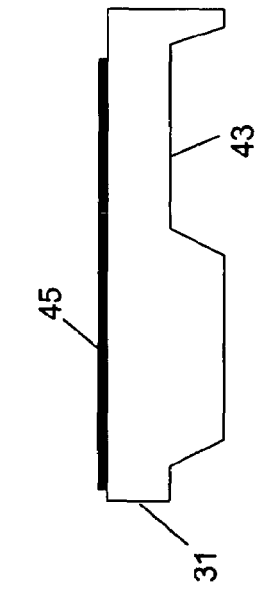
FIG. 10 is a view as in FIG. 9 after removal of oxide and application of a patterned photoresist.
Figure 11:
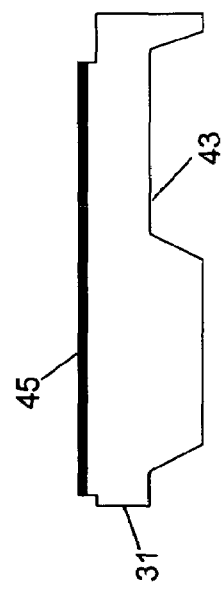
FIG. 11 is a view as in FIG. 10 after etching of exposed areas not covered by the photoresist.
Figure 15B:
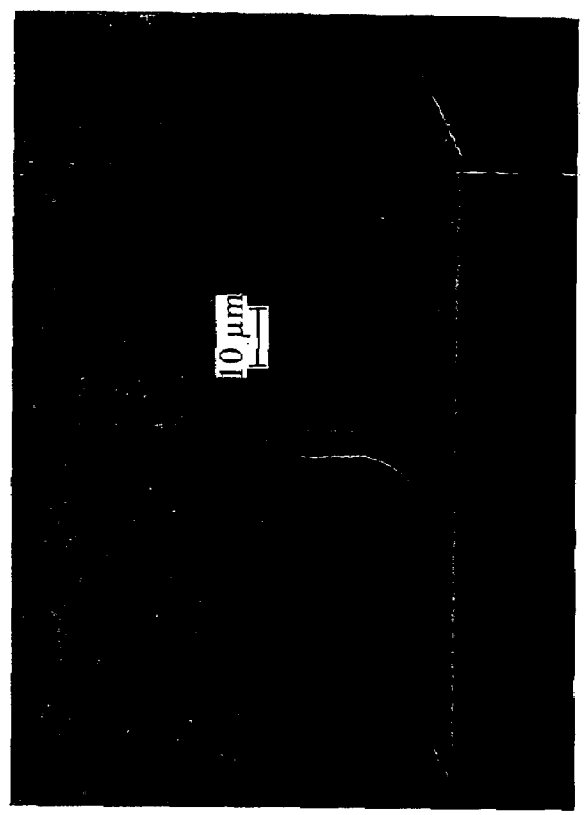
FIG. 15(b) is a closer photomicrograph perspective view of a probe tip on a cantilever beam in accordance with the invention.
Figure 15A:
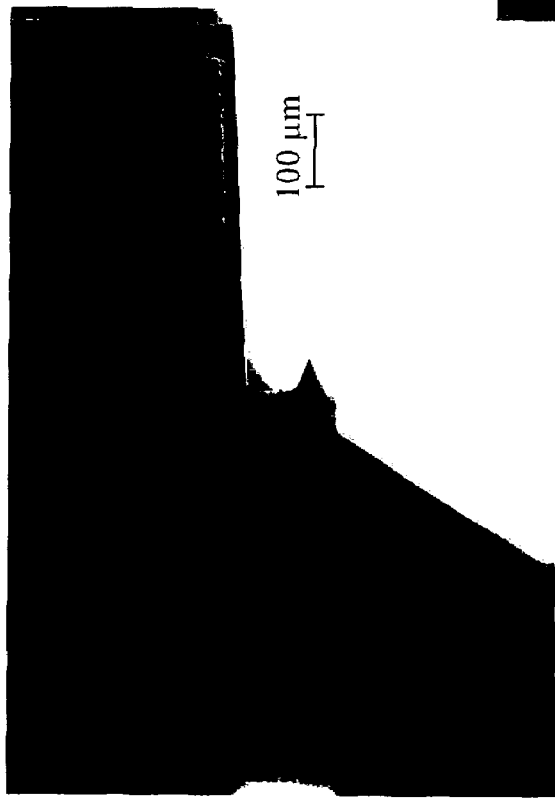
FIG. 15(a) is a photomicrograph perspective view of a probe tip on a cantilever beam in accordance with the invention.

A similar process can be used for fabricating tips on different substrate materials such as GaAs. Available commercial tools are PlasmaTherm 770 ECR or Omega® 201 ICP system from Trikon Technologies Ltd, Newport, United Kingdom. The GaAs substrate may be cleaned by $NH_4OH:H_2O_2:H_2O$ (1:1:5) solution (75° C. heated). Batch fabrication of AFM probes integrated with high aspect ratio tips is illustrated in FIGS. 8-14. The process starts with a $Si_3N_4$ film 42 deposition on the Si (100) wafer 31 by LPCVD as shown in FIG. 8. Windows 43 are opened on the backside of the wafer by photolithography and RIE. The wafer is etched in KOH solution to form the probe chip bodies as illustrated in FIG. 9. The cantilever thickness is etched by RIE using photoresist (PR) 45 as a mask layer as illustrated in FIGS. 10 and 11. A high aspect ratio tip 40 is fabricated using the aforementioned method after the growth of a 1 μm thermal oxide protection island 32 as illustrated in FIGS. 12 and 13. The distance from the tip to the cantilever beam end 48 is set to be 20 μm by considering the horizontal undercut during the STS DRIE step. The AFM probe is released by a backside RIE with a thick PR coating on the front side of the wafer, as illustrated in FIG. 14. FIG. 15(a) shows an SEM micrograph of a microfabricated AFM probe with a high aspect ratio tip. FIG. 15(b) shows a closer view of the microfabricated AFM probe. The tip has a height of 32 μm with an aspect ratio of 8. For comparison, one commercial AFM probe has a tip height of 15 μm and an aspect ratio of 1.5. Scans by such commercial AFM tips are limited by the low aspect ratio of the tip. Since typical stylus profilers cannot resolve features with several microns due to the size of the metal stylus, and typical AFM measurements only resolve features with heights of several microns, the present high aspect ratio tips are better suited than conventional tips for MEMS metrology to measure the topography and surface smoothness, and to obtain high resolution of the three-dimensional features of MEMS devices with heights up to tens of microns.

Another important application of high aspect ratio tips is for AFM-compatible scanning near-field microwave microscopy. A coaxial tip with extreme height can greatly reduce parasitic capacitive coupling between the cantilever and sample, therefore improving the sensitivity. The present microfabrication method can be used to make ultra-tall silicon coaxial tips with heights larger than 50 μm. The ultra-tall coaxial silicon tip microfabrication process is outlined in FIGS. 16-23. First a 1 μm-thick thermal oxide 30 is grown on the conductive Si (100) wafer 31 with a resistivity of 0.005 Ω·cm as shown in FIG. 16. The oxide mask 32 is patterned by standard photolithography and BHF acid etching as illustrated in FIG. 17. The exposed silicon is etched by a RIE to form the tip precursor 33 as illustrated in FIG. 18. Next, a DRIE process is performed using an STS® Multiplex ICP system to form the tip shaft 36 that determines the ultra-height of the tip 40. The oxide mask 32 is removed by hydrofluoric (HF) acid and the tip apex 38 is sharpened using the oxidation-sharpening method. An example microfabricated silicon tip has a height of 51 μm and apex radius less than 30 nm. This is ultra tall compared with the typical height of 10-20 μm for commercial AFM tips. To form the inner conductor of the coaxial tip structure, 300-nm-thick Cr film 50 is then deposited on the tip 40 and the wafer 31 as illustrated in FIG. 20. This first conductive layer is patterned by photolithography using negative-tone SU-8 resist to cover the ultra-tall tip 40. An insulation layer 52 for the coaxial tip is a 1-μm-thick silicon nitride layer deposited by plasma enhanced chemical vapor deposition (PECVD) as shown in FIG. 21. The outer shield or second metal layer 54 is a 1-μm-thick Cr film deposited by sputtering. It is patterned by another SU-8 photolithography step and etched to form the shield pattern to increase the apex covered by the first metal layer. A key step to fabricate coaxial tip 58 is a tip-exposure process that consists of a thick resist coating by AZ 4620 and an oxygen plasma etch to expose a portion of the Cr-coated tip in a controlled manner. The final coaxial tip 58 is formed by a Cr wet etch and a silicon nitride RIE as shown in FIG. 23. In an exemplary embodiment, the opening aperture radius of this structure is 3 μm.

Figure 24:
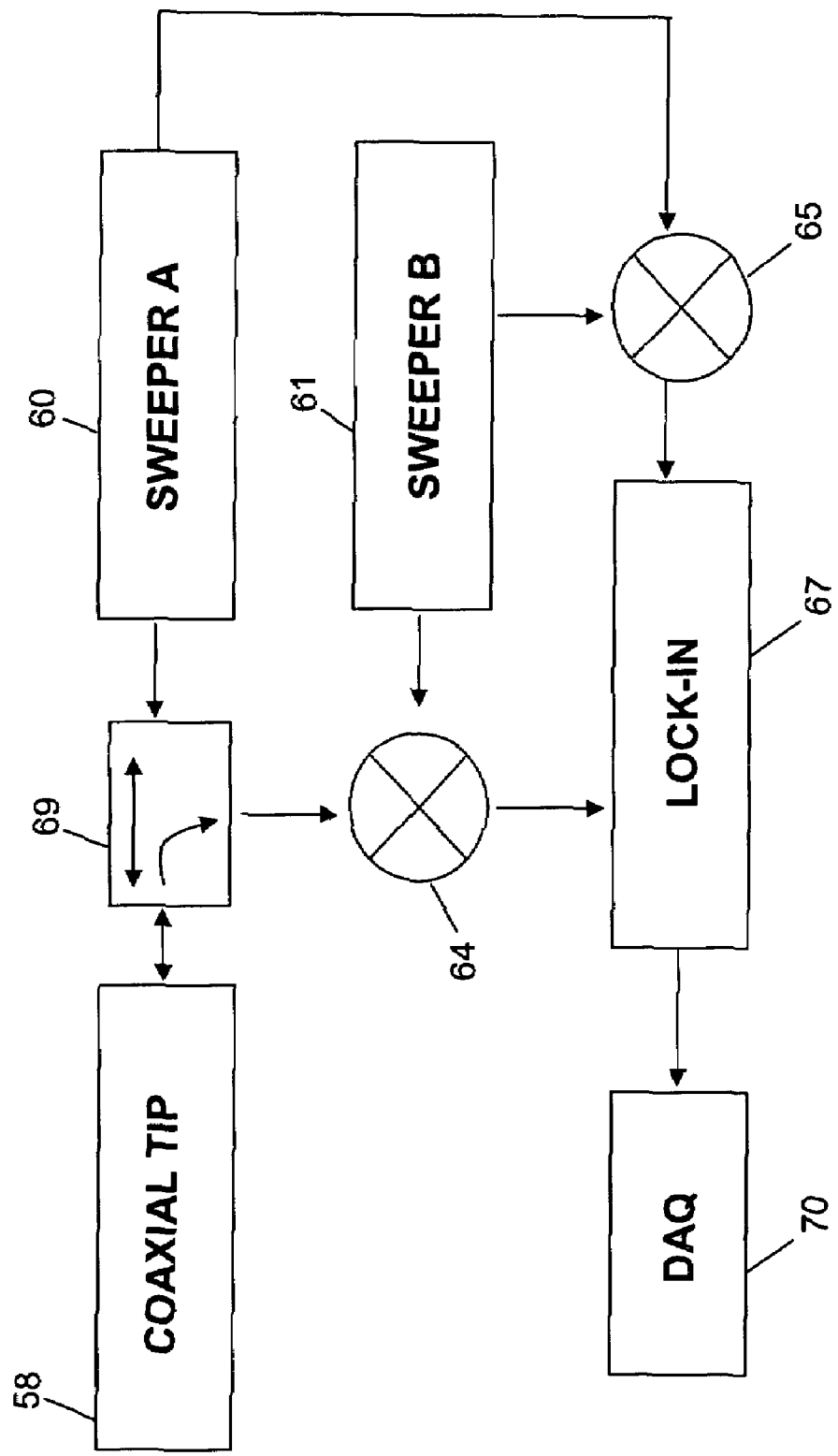
FIG. 24 is a schematic circuit diagram for a scanning near-field microwave microscopy system utilizing a coaxial probe tip in accordance with the invention.

In an exemplary embodiment, a scanning near-field microwave microscopy system schematic diagram is illustrated in FIG. 24. The frequency of sweeper A 60 is 2.36 GHz based on a network analyzer measurement. Sweeper B 61 is set at 2.36 GHz+90 kHz. Two mixers 64 and 65 are used to translate 2.36 GHz to 90 kHz, which lies in the working frequency range of a lock-in amplifier 67. A directional coupler 69 is used to guide the microwave source from sweeper A to the coaxial tip 58 to mixer 64. The output of mixer 64 contains the information from the sample. Mixer 65 mixes direct signals from both sweepers 60 and 61 as the reference signal for the lock-in amplifier 67. The lock-in amplifier output is delivered to a data acquisition (DAQ) channel 70 of the AFM system to build up a microwave image of the sample.

What is claimed is:

1. A method of fabrication of high aspect ratio micromechanical tips comprising:
   forming an etchant protective island on a surface of a silicon substrate with the silicon exposed around the island;
   isotropically etching the silicon substrate by reactive ion etching around the protective island to partially undercut the silicon substrate beneath the protective island;
   anisotropically etching, by deep reactive ion etching the silicon surrouding the island to a desired depth to define a tip shaft of the desired height supported at a base by the substrate;
   smoothing the walls of the defined tip shaft using a wet chemical clean and reactive ion etchin RIE;
   removing the protective island from the tip; and
   sharpening the top of the tip shaft to an apex.

2. The method of claim 1 wherein forming the protective island on the silicon substrate includes forming a layer of silicon dioxide on a surface of the substrate, lithographically patterning the silicon dioxide layer with a photoresist to define one or more islands covered by the photoresist, etching the silicon dioxide layer around the island or islands protected by the photoresist then removing the photoresist to leave the protective island or islands of silicon dioxide on the substrate.

3. The method of claim 2 wherein the protective oxide island is defined by etching of the oxide layer not covered by photoresist with buffered hydrofluoric acid.

4. The method of claim 1 wherein the isotropic etching is carried out by $SF_6$ reactive ion etching.

5. The method of claim 1 wherein the anisotropic etching is carried out by deep reactive ion etching (DRIE) utilizing a commercial DRIE etching system.

6. The method of claim 1 wherein the wet chemical clean uses an $H_2SO_4$: $H_2O_2$ solution and the RIE uses $SF_6/O_2$.

7. The method of claim 1 wherein the protective island is formed of silicon dioxide and the step of removing the protective island is carried out by etching the oxide is nd with a hydrofluoric acid solution.

8. The method of claim 1 wherein the protective island is circular with a diameter of about 10 μm or less.

9. The method of claim 1 wherein the width of the shaft after anisotropic etching is 10 μm or less.

10. The method of claim 1 wherein anisotropic etching is carried out to a depth from the protective island to the bottom of the substrate surrounding the shaft of at least 30 μm.

11. The method of claim 1 wherein the step of anisotropic etching is carried out to a depth such that the aspect ratio of the height of the shaft to the width of the shaft is at least 5.

12. The method of claim 1 further including patterning the substrate to form a cantilever beam extending from a support base to an outer end, the tip shaft formed integrally with the cantilever beam and extending away therefrom at a position adjacent the outer end of the cantilever beam.

13. The method of claim 1 wherein the sharpening is performed using oxidation sharpening.

14. The method of claim 1 further including the steps of depositing a first layer of conductive metal over the apex and at least a portion of the shaft, depositing a layer of insulator over the first conductive layer, and depositing a second conductive layer over the insulation layer, and removing the second conductive layer and the insulation layer from the point of the tip and a surrounding portion of the apex such that the second conductive layer is spaced from the point of the tip and electrically insulated by the insulation layer from the first conductive layer, such that the first and second conductive layers form inner and outer coaxial conductors.

* * * * *